(12) United States Patent
Bhaskaran

(10) Patent No.: US 7,454,692 B2
(45) Date of Patent: Nov. 18, 2008

(54) ENCODER BASED ERROR RESILIENCE METHOD IN A VIDEO CODEC

(75) Inventor: Vasudev Bhaskaran, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 623 days.

(21) Appl. No.: 11/077,102

(22) Filed: Mar. 10, 2005

(65) Prior Publication Data

US 2006/0206775 A1 Sep. 14, 2006

(51) Int. Cl.
- G06F 11/00 (2006.01)
- G08C 25/00 (2006.01)
- H03M 13/00 (2006.01)
- H04L 1/00 (2006.01)
- H04B 1/66 (2006.01)
- H04N 7/12 (2006.01)
- H04N 11/02 (2006.01)
- H04N 11/04 (2006.01)

(52) U.S. Cl. .................. 714/799; 714/747; 375/240.12; 375/240.18; 375/240.21; 375/240.22

(58) Field of Classification Search .............. 375/240.12–240.22; 714/747, 799

See application file for complete search history.

(56) References Cited

U.S. PATENT DOCUMENTS

| 6,327,689 | B1* | 12/2001 | Tian ........................... 714/751 |
| 6,744,816 | B1 | 6/2004 | Park et al. |
| 6,768,775 | B1 | 7/2004 | Wen et al. |
| 2003/0043856 | A1* | 3/2003 | Lakaniemi et al. .......... 370/503 |
| 2004/0168110 | A1* | 8/2004 | Fuldseth et al. ............... 714/48 |

\* cited by examiner

*Primary Examiner*—Joseph D Torres

(57) ABSTRACT

Improved error resiliency of an encoding device, such as a video codec or encoder, operating in a compressed data transmission system, is achieved by enabling the encoding device to "shadow" or mimic the error conditions of a decoding device that receives and decodes compressed data sent by the encoding device. The encoding device is made aware of the specific error concealment scheme that the decoding device employs to reconstruct video frame data from a bit stream that contains bit or packet errors, and is also made aware of the location(s) in the frame to which the erroneous data corresponds and the particular manner in which the erroneous data was handled. The error-concealed data then can be used not only for the present encoding, but for subsequent encodings as well, to achieve synchronization between the encoder and decoder. Advantageously, the present invention improves on, but can work with, conventional error concealment schemes.

3 Claims, 4 Drawing Sheets

ENCODER BASED ERROR RESILIENCE METHOD IN A VIDEO CODEC

BACKGROUND OF THE INVENTION

1. Field of the Invention

The present invention relates to error resilience control techniques that can be applied to a compressed data transmission system in which data is encoded and sent from an encoding device and received and decoded by a decoding device. The techniques may be realized as a method or algorithm, the functionality of which can be embodied in an encoding device, e.g., a codec or encoder. The functions can be realized in the form of software, hardware, or combination thereof.

2. Description of the Related Art

In a packet-based or circuit-switched-based environment sometimes the compressed bit stream becomes corrupted as a result of bit or packet errors. In such situations, the video decoder associated with the receiver, upon determining that erroneous data has been received, typically implements a process known as error concealment. Error concealment generally involves replacing the missing or erroneously reconstructed video data by copying previously reconstructed video data that is stored in the receiver's buffer. Usually the previously reconstructed video data is the data of the previous frame.

There are disadvantages with such error concealment approaches. One disadvantage is error propagation and the lack of control over it. Because of the motion compensated prediction employed in the encoder, in order to reconstruct the next frame, information from a previous frame is used. However, if error concealment was employed for the previous frame, the current frame, when reconstructed, will have errors that have been propagated from two frames ago. This propagation may go on for several frames. In addition to causing error propagation, another disadvantage of error concealment schemes is loss of video quality. Schemes based on reducing the frame rate to combat packet losses also cause loss of video quality.

Attempts have been made to mitigate error propagation. For example, the encoder can be configured to encode in the intra-frame mode or an intra-macroblock refresh mode under certain conditions. Changing the reference picture selection has been proposed in H.264. While these techniques are generally effective, they also significantly increase the bit-rate of the codec.

SUMMARY OF THE INVENTION

Accordingly, it is an object of the present invention to provide an improved error resilience technique that significantly reduces error propagation in a data transmission system, without significantly increasing the bit-rate, and while maintaining high video quality.

According to one aspect of the invention, a method for controlling error resilience in a compressed data transmission system is provided. The method comprises determining whether a portion of a received bit stream corresponding to a frame contains erroneous data. If so, then the following steps are performed: determining which location or locations in the frame the erroneous data corresponds to; applying a specific error concealment algorithm in decoding the determined location or locations in the frame; and sending a signal to an encoding device from which the received bit stream originated. The signal contains information indicating that a portion of the received bit stream contains erroneous data, and identifying the location or locations of the frame corresponding to the erroneous data and a specific operation applied in decoding the location or locations in the frame to which the erroneous data corresponds. In accordance with the invention, the encoding device is also aware of the specific error concealment algorithm applied.

The method may, and preferably does, further comprise recreating an error-concealed decoded version of the frame based on the information contained in the signal; and using the recreated, error-concealed decoded version of the frame for subsequent encoding.

In another aspect, the invention involves a system having improved error resilience functionality. The system comprises an encoding device configured to encode and then transmit data to a decoding device that receives and then decodes the encoded data, wherein the decoding device has a specific error concealment algorithm embodied therein. The encoding device is configured to mimic error conditions of the decoding device based on a signal received from the decoding device, the encoding device being aware of the specific error concealment algorithm of the decoding device.

Preferably, the signal contains information indicating that a portion of the encoded data received by the decoding device contains erroneous data, and identifying one or more locations in an associated frame corresponding to the erroneous data and a specific operation applied in decoding the location or locations in the frame to which the erroneous data corresponds.

The signal may further contain information identifying the specific error concealment algorithm applied in decoding the location or locations in the frame to which the erroneous data corresponds.

In the system described above, the encoding device may be, and preferably is, further configured to recreate an error-concealed decoded version of the frame based on the information contained in the received signal, and to use the recreated, error-concealed decoded version of the frame for subsequent encoding.

The encoding device may be an encoder, codec, or other device with encoding functionality.

According to another aspect of the invention, the error resilience method and/or steps thereof can be specified by program instructions, e.g., software, that are embodied on a device-readable medium. Such medium may reside in a codec, encoder, or like device. The program instructions are not limited to software form. Alternatively, instructions may be specified directly by a hardware configuration, e.g., an application specific integrated circuit (ASIC), a programmable logic array (PLA), logic circuits, digital signal processing circuitry, and/or discrete electronic components, that is directly embodied in the codec or other device with encoding functionality.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings like reference symbols refer to like parts.

DESCRIPTION OF THE PREFERRED EMBODIMENTS

The present invention significantly improves the error resiliency of an encoding device, such as a video codec or encoder, conforming to the H.263 or H.264 standards, and operating in a compressed data transmission system. The invention generally involves a "shadowing" scheme, in which the error conditions of a decoding device that receives and decodes compressed data sent by an encoding device is mimicked in the encoding device. More specifically, the encoding device is made aware of the specific error concealment scheme that the decoding device employs to reconstruct video frame data from a bit stream that contains bit or packet errors, and is also made aware of the location(s) in the frame to which the erroneous data corresponds and the particular manner in which the erroneous data was handled. The error-concealed data then can be used not only for the present encoding, but for subsequent encodings as well, to achieve synchronization between the encoder and decoder. Advantageously, the present invention improves on, but can work with, conventional error concealment schemes.

One environment in which the present invention may be employed is a videoconference. In a typical videoconference setting, each site is equipped with an encoder and a decoder, individually or integrated as a single unit (codec). Typically, one of the sites is a server and the others are clients.

Figure 1:
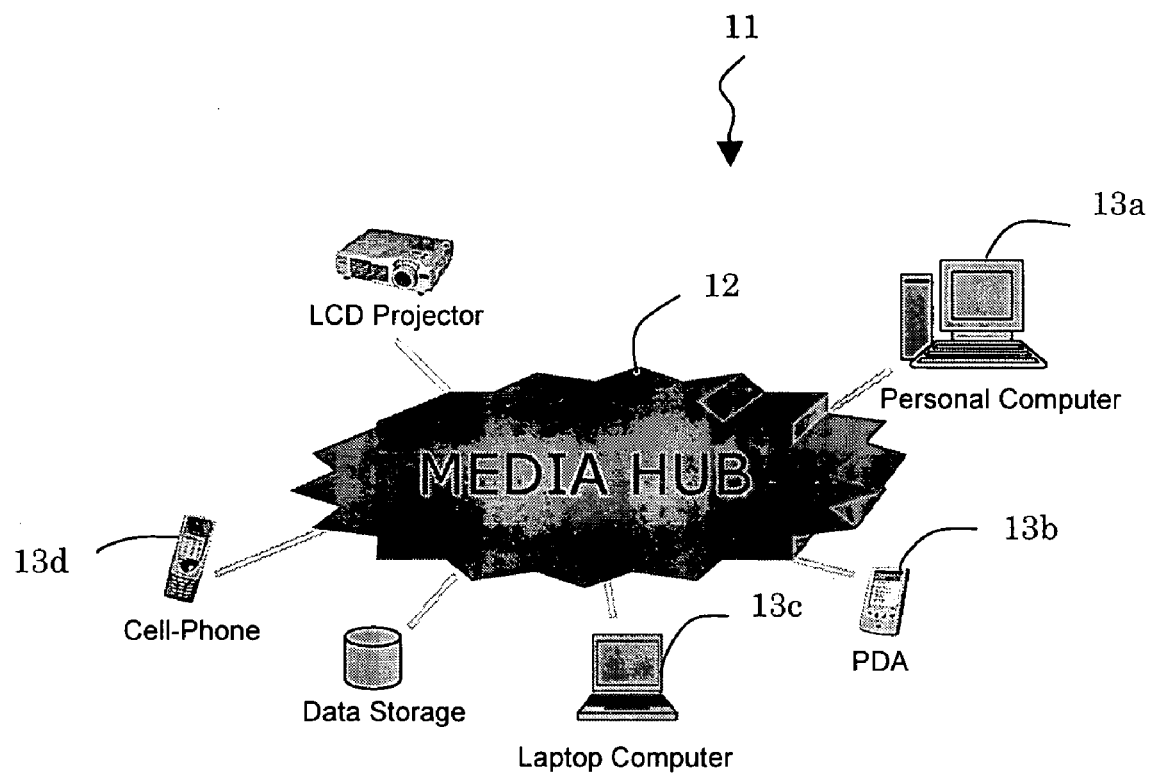
FIG. 1 is a schematic illustration of a videoconferencing system in accordance with embodiments of the present invention.

FIG. 1 schematically illustrates a videoconference system 11 in which the present invention may be practiced. System 11 comprises a server 12 and a plurality of client devices 13. Server 12 may be of the type that is used in a typical videoconference system. In one embodiment, the server functions as a media hub to provide seamless communication between different client devices in an intelligent media exchange (IMX) system, e.g., a large-scale videoconference system with many capabilities. The client devices 13 with which the server is in communication may be of any of a variety of types: personal computer 13a, personal digital assistant (PDA) 13b, laptop 13c, cell phone 13d, etc. The number and type of client devices 13 in system 11 will, of course, vary depending on the needs being serviced by system 11 and the system's available resources. The invention is primarily designed for those client devices having video viewing capability. Moreover, as will be explained below, the invention is not suitable for low-memory devices, which will include some hand-held devices.

The principal component at each site is the encoder/decoder assembly or codec. Two codecs 22a and 22b, at two different sites respectively, are shown, along with the system data flow, in FIG. 2. Two sites are shown for illustrative purposes only; the system may include more than two sites as discussed above. In a server-based system, such an arrangement enables each client device to receive content from, and send content to, any of the other client devices in the system through via a network and the server. In a peer-to-peer system, client devices can communicate directly with one another over the network.

Other devices may be provided at a particular videoconferencing site, depending on the particular environment that the system is supporting. For example, if the system is to accommodate a live videoconference, each site may also include (if not already included in the client device) appropriate devices to enable the participant at that site to see and communicate with the other participants. Such other devices (not shown) may include camera(s), microphone(s), monitor(s), and speaker(s).

Each codec 22a/22b includes both an encoder 23a/23b and a decoder 24a/24b. The encoder 23 digitizes and compresses incoming signals, multiplexes those signals, and delivers the combined signal (e.g., a baseband digital signal) to a network for transmission to other codecs in the system. The decoder 24 accepts a similarly encoded signal from the network, demultiplexes the received signal, decompresses the video and audio, and provides analog video and audio outputs for delivery of the content to the appropriate viewing and listening devices. A typical codec has a several techniques that may be employed in digitizing and compressing video and audio, including picture resolution reduction, color information transformation and sub-sampling, frame rate control, intra- and inter-frame coding, and entropy coding. In some applications, e.g., business group videoconferencing systems, the codec will typically contain more functions, in addition to video, audio and network functions. Such codecs accept and multiplex data from graphics devices and computers. These codecs may also accept inputs from control panels and hand-held remotes.

Figure 3A:
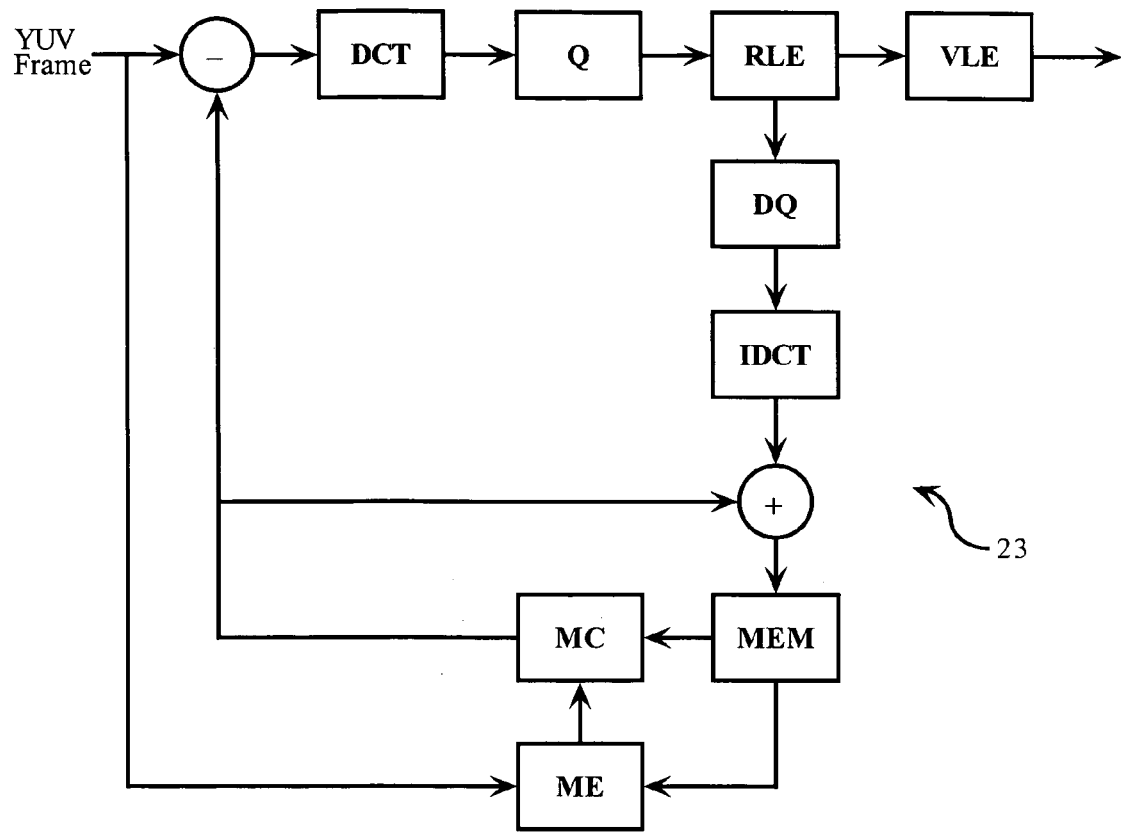
FIG. 3(a) and (b) are functional block diagrams of encoder and decoder portions respectively of a codec configured in accordance with embodiments of the invention.

A more detailed diagram of certain components of encoder 23a/23b and the processing they perform is shown in FIG. 3(a). With respect to video data, encoder 23 receives a current video frame represented by a block of pixels (which may be in YUV color space). That frame is sent to a motion estimation (ME) module where a motion vector is generated and to an operator where a best-matching block of the previous frame and a block to be coded in the current frame are differenced to predict the block in the current frame and to generate a prediction error. The prediction error, along with the motion vector, is transmitted to a Discrete Cosine Transform (DCT) module where the data is transformed into blocks of DCT coefficients. These coefficients are quantized in a Quantization (Q) module. A Run Length Encoder (RLE) and a Variable Length Encoder (VLC) encode the data for transmission.

The motion compensation loop branches off from the Q module. The quantized coefficients of the prediction error and motion vector and dequantized in a DeQuantization (DQ) module and subjected to an inverse DCT operation in a IDCT module. That result is combined with the motion compensated version of the previous frame and stored in a frame buffer memory (MEM). The motion vector is generated from the result stored in MEM and the current unprocessed frame in a Motion Estimation (ME) module. The motion vector is provided to a Motion Compensation (MC) module where the best-matching block of the previous frame is generated.

Figure 3B:
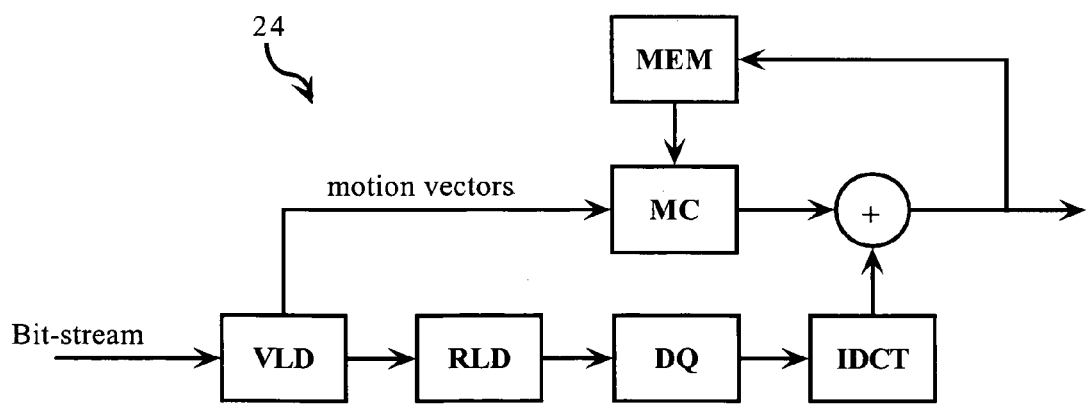

The decoder 24a/24b essentially reverses the operations of the sending encoder 23a/23b. As shown in FIG. 3(b) decoder 24 receives a bit-stream (preferably H.263 compliant) to which variable length and run length decoding operations are applied in VLD and RLD modules, respectively. The resulting data is dequantized in a DQ module and that result subjected to an IDCT operation to recover a pixel representation. The VLD module also generates a motion vector for the current frame and that vector is supplied to a MC module, which takes that and the previous frame in memory (MEM) and generates a motion compensation vector. That motion compensated vector is summed with the recovered pixel representation from the IDCT module to yield a current frame. To handle erroneous data decoder 24 employs a specific error concealment scheme, which will be described in more detail below.

Having described an environment in which the invention may be practiced as well as certain details of the encoding and decoding processes, the discussion now turns to the specific functionalities with which an encoding device, e.g., a codec or encoder, is configured to achieve error resilience in accordance with the invention. The encoding device is configured to be aware of the specific error concealment scheme or algorithm employed by the decoding device receiving the data sent by the encoding device. This functionality can be achieved by preprogramming the encoding device, or the encoding device could be made aware of the decoding device's error concealment scheme by receiving such information in a signal from the decoding device. The signal is provided in any case to make the encoding device aware of the location(s) in a particular frame to which the scheme was applied. The encoding device is further configured to mimic or shadow the error conditions of the decoding device, which the encoding device does in response to receiving the signal from the decoding device.

Figure 2:
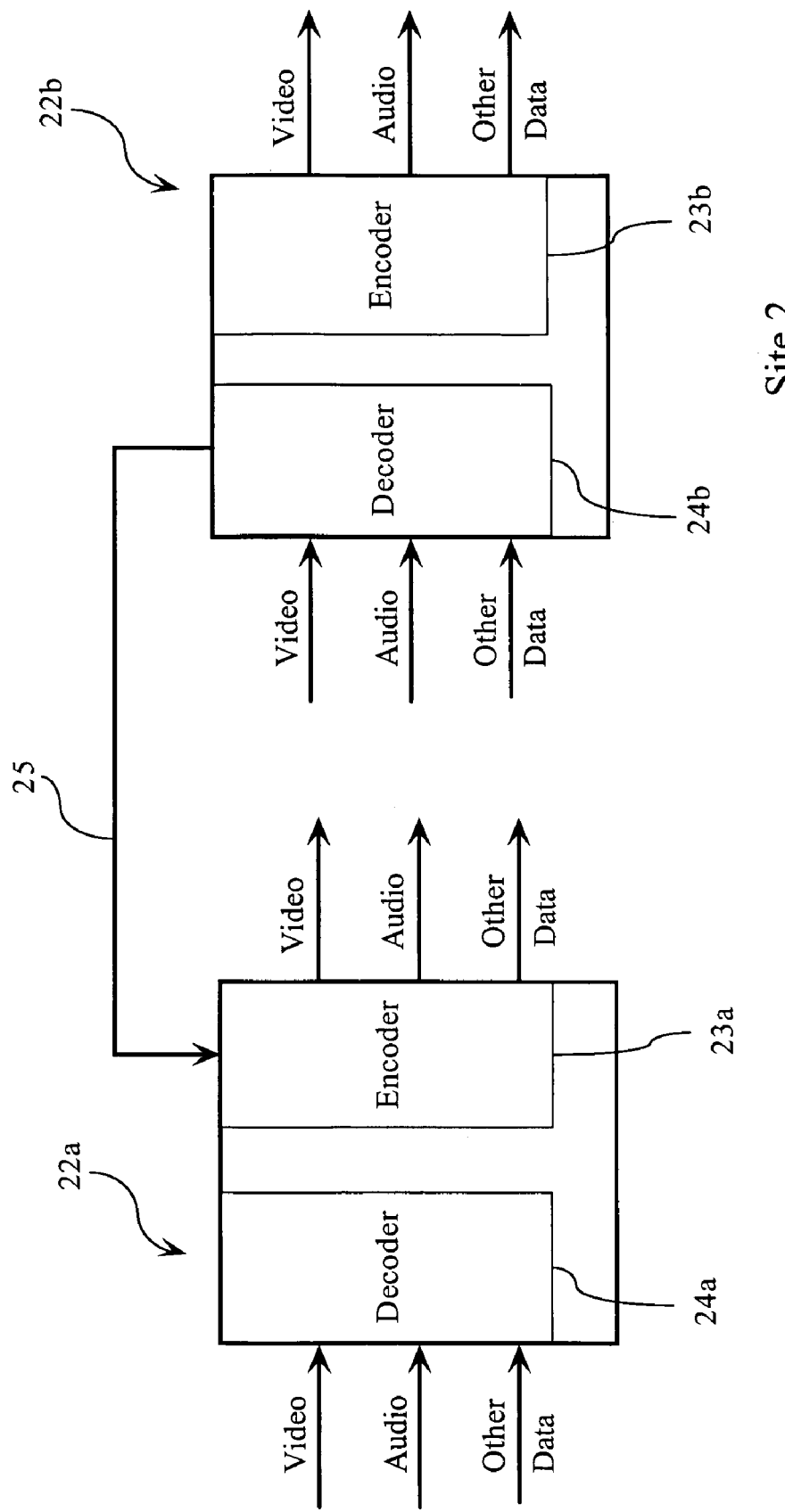
FIG. 2 is a block diagram showing the data flow of an exemplary video conferencing system in which a codec (encoder/decoder) is installed at each site.

For example, in the embodiment illustrated in FIG. 2, encoder 23a is aware of the error concealment scheme used by decoder 24b, either by being so preprogrammed or by receiving such information in a signal sent through a control channel or auxiliary communication link 25 from decoder 24b. In either case, the signal received by encoder 23a contains specific information as to how the error concealment was applied to a particular frame. Encoder 23a is further configured to mimic the error conditions of decoder 24b in response to this information. The same set-up/arrangement can be applied to encoder 23b with respect to decoder 24a. With this configuration, the sending encoder and receiving decoder will always be in synchronization, even when there are packet or bit error losses. As a result, error propagation will be limited. Moreover, since intra-macroblock refreshes are not needed to improve error resilience, there is no increase in bit-rate. Also, since the sending encoder and receiving decoder are in sync, any image quality degradation will not be significant as compared to a frame rate changing approach.

Figure 4:
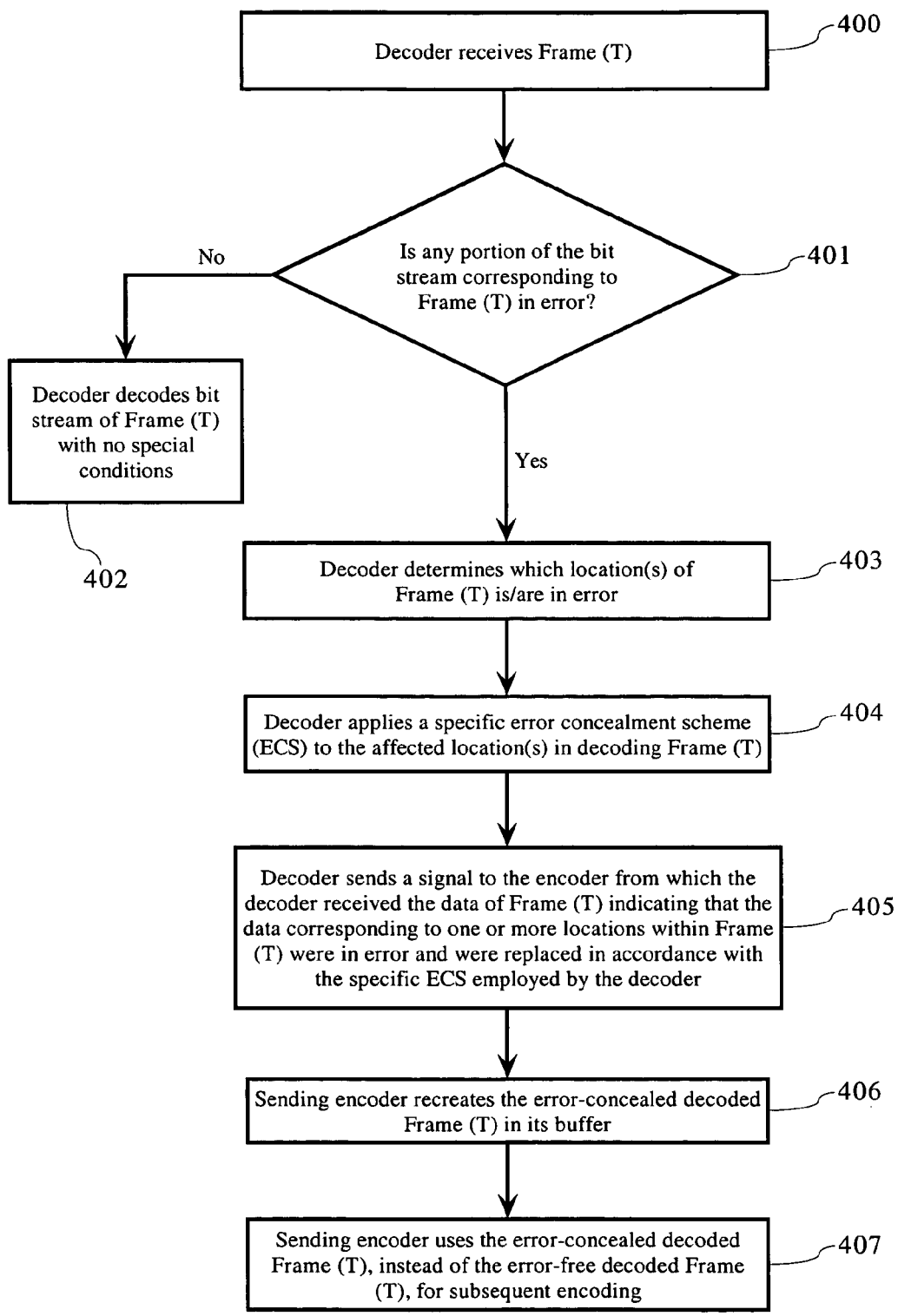
FIG. 4 is a flow chart illustrating an error resilience process, according to embodiments of the invention.

FIG. 4 is a flow chart generally illustrating a method or algorithm for improving error resilience in a video codec or encoder, according to embodiments of the invention. Encoder 23a and decoder 24b are used as an exemplary encoder/decoder pair for purposes of describing the error resilience algorithm. The algorithm begins at step 400 in which decoder 24b receives a video frame, Frame (T). Next, in step 401, decoder 24b determines whether or not some portion of the received bit stream corresponding to Frame (T) are in error. If not, then decoder 24b simply proceeds to decode Frame (T) as it normally would, that is, with no special conditions (step 402).

However, if some portion of the bit stream contains errors, decoder 24b determines which location or locations in Frame (T) the erroneous data corresponds to (step 403). In step 404, decoder 24b then applies an error concealment scheme, which can be, for example, to copy decoded data from corresponding locations of a past video frame, e.g., Frame (T-1), pointed to by the corresponding motion vectors, and to use this copied data in place of the erroneous data for the problem location(s) identified in Frame (T) in decoding Frame (T). Frame (T-1) refers to the immediately previous video frame relative to Frame (T). Then, in step 405, decoder 24b sends a signal to encoder 23a through communication channel 25 indicating that the data corresponding to one or more particular locations, e.g., locations a, b, c, ..., etc., within Frame (T) were in error and were decoded by, say, copying data from the corresponding location(s) in a past frame, e.g., Frame (T-1), and using that copied data in place of the erroneous data for the location(s) in Frame (T). The signal may also inform encoder 23a of the specific error concealment scheme employed by decoder 24b, if the encoder has not already been preprogrammed with that information.

When encoder 23a receives this information, it then recreates the error-concealed decoded Frame (T) in its buffer (step 406). Encoder 23a then uses that decoded frame, instead of the error-free decoded Frame (T), for subsequent encoding (step 407). Thus, encoder 23a and decoder 24b are now in sync.

Sometimes, e.g., in real-time applications, the roundtrip delay between the sending of encoded data by encoder 23a and receipt of the signal by the encoder may be more than one frame transition. In such situation, while the encoder 23a is operating on Frame (T), it may get the error location map for Frame (T-2), and also quickly determine from the motion field linkages between Frame (T-2) and Frame (T-1) which areas in Frame (T-1) are affected and make those corrections while encoding Frame (T).

As will be understood from the foregoing, the above-described algorithm increases the memory requirements of the encoder, since the frame buffer of the encoder (MEM in FIG. 3(a)) must store both the error-free frame and the error-concealed frame, as one or the other will be used to reconstruct subsequent frames. Thus, the algorithm is not suitable for low memory applications.

As will be appreciated, the present invention requires that the sending encoder be made aware of the error concealment scheme that is employed by the receiving decoder. Also, there needs to be a control channel or auxiliary communication link between each sending encoder and each decoder that receives data from that encoder, so that that encoder knows of the specific error conditions encountered by the decoder receiving the data and how the errors were handled. Thus, in a videoconference system in which there are more than two participants and hence more than two encoder/decoder assemblies, each decoder should employ the same error concealment scheme, and each encoder is in communication with each of the decoders at the other sites.

With these requirements, the present invention will be more difficult to implement when the encoder and decoder are from different vendors. Moreover, the present invention is not practical for streaming applications or store-forward applications, since in this case, encoding is done once and decoding takes place at a much later time. The same is true for multicast applications, i.e., where there is one encoder and many decoders. However, despite these restrictions, since a majority of applications related to video codec are in two-way communication scenarios such as video conferencing, the present invention has still significant merit.

Indeed, as the foregoing demonstrates, the present invention provides improved error resilience techniques that may be incorporated into an encoding device, e.g., a video codec or encoder, operating in cooperation with a decoding device, e.g., a video codec or decoder, that receives and decodes the data sent by the encoding device. Error resilience of the system is significantly improved, as the sending encoder and receiving decoder achieve synchronization quickly after packet losses are detected. Advantageously, the techniques of the present invention reduce error propagation without causing a significant bit-rate increase. More specifically, the inventive techniques cause no increase in the downstream bit-rate and only a very small increase in the upstream bit-rate since the error locations have to be signaled to the encoder. Moreover, because of the improved synchronization, overall image quality is also improved with respect to conventional error concealment schemes.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method for controlling error resilience in a compressed data transmission system, the method comprising:

determining whether a portion of a received bit stream corresponding to a frame contains erroneous data;

if so, then determining which location or locations in the frame the erroneous data corresponds to;

applying a specific error concealment algorithm in decoding the determined location or locations in the frame; and sending a signal to an encoding device from which the received bit stream originated, the signal containing information indicating that a portion of the received bit stream contains erroneous data, and identifying the location or locations of the frame corresponding to the erroneous data and a specific operation applied in decoding the location or locations in the frame to which the erroneous data corresponds, wherein the encoding device is aware of the specific error concealment algorithm applied.

2. A method as recited in claim 1, further comprising the steps of:

recreating an error-concealed decoded version of the frame based on the information contained in the signal; and using the recreated, error-concealed decoded version of the frame for subsequent encoding.

3. A method as recited in claim 1, wherein the data includes video data.

* * * * *